United States Patent [19]

Mahlein

[11] 4,278,322

[45] Jul. 14, 1981

[54] COUPLING DEVICE FOR COUPLING OF TWO WAVEGUIDES

[75] Inventor: Hans F. Mahlein, Munich, Fed. Rep. of Germany

[73] Assignee: Siemens Aktiengesellschaft, Berlin & Munich, Fed. Rep. of Germany

[21] Appl. No.: 45,946

[22] Filed: Jun. 6, 1979

[30] Foreign Application Priority Data

Jun. 30, 1978 [DE] Fed. Rep. of Germany ....... 2828802

[51] Int. Cl.³ .............................................. G02B 5/14
[52] U.S. Cl. ............................ 350/96.18; 350/96.15; 350/413
[58] Field of Search ............... 350/96.15, 96.17, 96.18, 350/96.12, 175 GN

[56] References Cited

U.S. PATENT DOCUMENTS

| | | | |
|---|---|---|---|
| 3,779,628 | 12/1973 | Kapron et al. ..................... | 350/96.15 |
| 3,829,195 | 8/1974 | Rawson ............................. | 350/96.18 |
| 3,894,789 | 7/1975 | Kobayashi et al. ................ | 350/96.18 |
| 3,949,318 | 4/1976 | Zeidler .............................. | 350/96.17 |
| 4,025,157 | 5/1977 | Martin .............................. | 350/96.18 |

*Primary Examiner*—Stewart J. Levy
*Attorney, Agent, or Firm*—Hill, Van Santen, Steadman, Chiara & Simpson

[57] ABSTRACT

A coupling device for coupling two waveguides having different cross sections, for example a layer conductor or laser element to a strip conductor, characterized by a telescopic system, which narrows the beam cross section of the larger of these two waveguides and directs it onto a large cross-sectional end of a tapering waveguide, which tapers down to the cross section of the other waveguide or conductor. The telescopic system can be composed of one conical gradient lens, two coaxial gradient lenses, or a gradient lens coaxially arranged with a conical gradient lens. The tapering waveguide preferably is integral with the strip waveguide or conductor and is of the same type.

10 Claims, 1 Drawing Figure

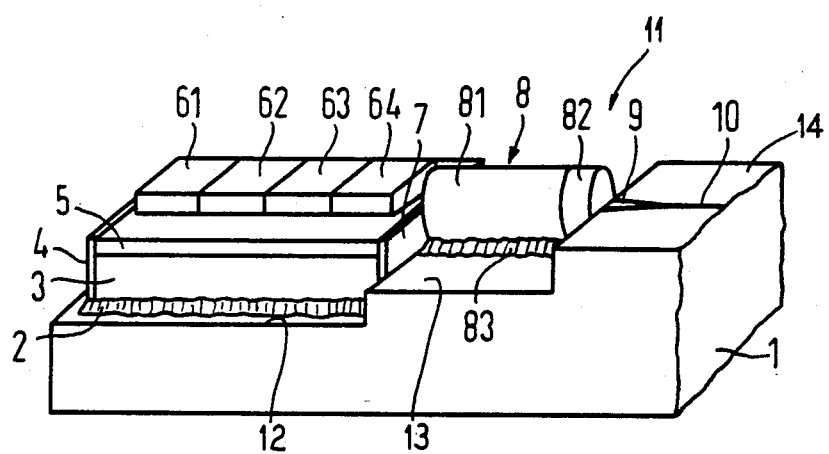

COUPLING DEVICE FOR COUPLING OF TWO WAVEGUIDES

BACKGROUND OF THE INVENTION

The present invention is directed to a coupling device for coupling two optical waveguides having different cross sections to one another and in particular for coupling a layer conductor to a strip conductor.

In order to produce a laser transmitter for optical communications technique, which transmitter consists of a waveguide laser, which, for example, is formed with a stoichiometric neodymium compound, and a subsequent waveguide modulator, which consists of an electro-optical material, for example of lithium niobate, it is necessary to couple the waveguides of the two components with a low loss. The considerable problems, which this type of coupling arrangement must be resolved, are the adjustment of the cross-sectional area, for example the adjustment of a cross-sectional area of $10 \times 30$ $\mu m^2$ in the laser to a cross section of approximately $4 \times 3$ $\mu m$ in a waveguide modulator and the phase adjustment, for example the adjustment of a refractive index of approximately 2.2 in the waveguide modulator.

SUMMARY OF THE INVENTION

The present invention is directed to producing a low loss coupling device for coupling two optical waveguides having different cross-sectional areas in particular for coupling a layer conductor to a strip conductor.

To accomplish these tasks, the coupling device of the present invention comprises a telescopic means for narrowing a beam cross section of an incident light from one conductor and a tapering optical waveguide being positioned to receive the light emerging from said telescopic means and having a decreasing cross section extending away from said means.

The telescopic means or system is advantageously formed by two coaxial gradient lenses of different focal lengths. The telescopic means can also be designed with a conical gradient lens. With a suitable dimensioning of the conical gradient lens, it is even possible that the telescopic system is formed with only one conical gradient lens and in such a case, a telescopic system may be produced as one piece.

It is also possible to use several cylindrical gradient lenses or conical gradient lenses or mixtures of cylindrical gradient lenses with conical lenses. If several lenses are utilized, they are expediently cemented to one another.

The tapering waveguide is advantageously integral with the strip waveguide and is of the same type.

The coupling device of the present invention can be realized with a compact design and has a particularly low loss between the coupling of the two conductors. The proposed coupling device can be produced very easily.

BRIEF DESCRIPTION OF THE DRAWING

The FIGURE is a perspective illustration of a coupling device of the present invention coupling a laser transmitter to a waveguide modulator.

DESCRIPTION OF THE PREFERRED EMBODIMENT

The present invention is particularly useful in a coupling device generally indicated at 11 in the FIGURE for coupling a strip waveguide or strip conductor 10 to a laser active layer 5, which acts as a layer conductor.

As illustrated in the FIGURE, a substrate 1 of electrooptical material, for example lithium niobate, has three levels 12, 13 and 14 which can be produced by etching. A laser substrate 3 is attached or mounted on the lowest level 12 by cement 2. The laser active layer 5 of the laser is disposed on the substrate 3 and is provided with laser reflectors or mirrors 4 and 7. Luminescent diodes 61, 62, 63 and 64 are arranged on a surface of the laser active layer 5 and the luminescent diodes will supply a pumping light. An example of a type of laser used for the laser active layer 5 is a neodymium laser.

The laser active layer 5 of the laser forms one of the two waveguides to be coupled and in the illustrated embodiment, represents the layer conductor. A telescopic means or system 8 is mounted with the aid of cement 83 on a second level 13 of the substrate 1. As illustrated, this telescopic means 8 consists of two coaxial cylindrically formed gradient lenses 81 and 82. The lens 81, which abuts the laser 5 with one of its frontal surfaces, has a greater focal length than the gradient lens 82, which abuts the other frontal surface of the lens 81 with one of its two frontal surfaces. The levels 12 and 13 of the substrate 1 on which the laser and the telescopic means 8 are positioned are dimensioned in such a way that the cylindrical axis of the telescopic system or means 8 is at the same height as the axis of the laser active layer 5.

A third level 14 of the substrate supports a tapering waveguide 9 and a strip waveguide or conductor 10 which is attached thereto. As illustrated, the two waveguides 9 and 10 are designed as an integral strip conductor and are arranged at the height of the axis of the layer conductor 5 of the laser and of the cylindrical axis of the telescopic means 8. The waveguide 9 has its greatest width and cross section adjacent to the telescopic means 8 and tapers to the width or cross section of the waveguide 10. The thickness of the waveguides 9 and 10 are selected to be equal. While the edges of the waveguide 9 can be straight, which straight edges will cause a bend or break at the transition to the waveguide 10, a smooth or gradual transition between the edges of the waveguide 9 and 10 is preferred to obtain a better light transmission from the guide 9 to 10. An exponential tapering or tapering with a parabolic shaped-edging curve is better suited than a transition with a break or bend which occurs when two straight line edges meet.

The production of the tapering waveguide 9 can be accomplished at the same time as producing the waveguide 10. For example, in the sample embodiment illustrated, the substrate 1, which is of an electro-optical material, can be provided with a mask which covers all portions of the surface except for the area of the surface in which the waveguides 9 and 10 are to be formed. The waveguides can then be produced directly underneath the substrate surface or more precisely just beneath the third level 14 of the substrate 1 in one diffusing step which is a conventional type of diffusing step.

The coupling element 11 shown in the sample embodiment is particularly suited for coupling of a layer conductor to a strip conductor. The cross section of the layer conductor normally is one magnitude larger than the cross section of the strip conductor; however, they are of approximately the same shape.

Nevertheless, the present invention is not limited to this specific sample embodiment. Waveguides of different cross-sectional forms can also be coupled to one another using the coupler of the present invention. In order to adjust one cross-sectional form to the other, for example a circular cross section to a rectangular cross section, more general forms can be used for tapering waveguide 9. A depth or thickness taper, for example, could be used. Thus, a waveguide tapering in a vertical direction instead of the horizontal direction as illustrated in the sample embodiment. The waveguide 9 also can be a combination of tapering in both depth or thickness and width. When a combined taper is utilized, a change in the cross section in both the width and thickness can be obtained.

The telescopic system or means of the sample embodiment is produced by two coaxial cylindrical gradient lenses 81 and 82 of different focal length. Such gradient lenses can be assigned to focal lengths, main planes, etc. In short, the determinants can be assigned to Gaussian optics and the system or means consisting of such gradient lenses can be computed in accordance with the rules of Gaussiam optics. The telescopic system of the present invention has the objective to produce first reductions of the beam cross section of the incoming light and the taper waveguide reduces the reduced beam cross section once more and adjusts it to the outgoing waveguide.

The telescopic means or system of the present system is not limited to two gradient lenses but, for example, can also consist of one single conical gradient lens. All gradient lenses or lens systems, which will reduce the diameter or cross section of an incoming light beam at least in one direction, are usable. A radial reflective index course curve, for example, must not necessarily be rotational symmetric in the gradient lens.

From the above description of the invention, it can be seen that a higher flexible and adaptive coupling device is provided by means of the inventive combination of the telescopic means and the tapering waveguide. It can also be seen that the coupling device of the present invention can be produced in a compact design and in a simple manner.

Although various minor modifications may be suggested by those versed in the art, it should be understood that I wish to embody within the scope of the patent granted hereon, all such modifications as reasonably and properly come within the scope of my contribution to the art.

I claim:

1. A coupling device for coupling two optical waveguides having different cross sections, in particular for coupling a layer conductor to a strip conductor, said device comprising a telescope system of lenses for narrowing the beam cross section of an incident light and a tapering optical waveguide being positioned to receive the light emerging from said system and having a decreasing cross section extending away from said means.

2. A coupling device according to claim 1, wherein the tapering waveguide merges with one of said waveguides and is composed of the same material as said one waveguide.

3. A coupling device according to claim 1, wherein the telescope system includes at least two gradient lenses cemented to one another.

4. A coupling device according to claim 3, wherein the tapering waveguide is integral with one of said two optical waveguides, said tapering and one waveguide being of the same type of waveguide.

5. A coupling device according to claim 1, wherein the telescope system is formed by one conical gradient lens.

6. A coupling device according to claim 5, wherein the tapering waveguide tapers to the cross section of one of said optical waveguides and said one optical waveguide and tapering waveguide are integrally formed as the same type of waveguide.

7. A coupling device according to claim 1, wherein the telescope system is formed by two coaxial gradient lenses of different focal lengths.

8. A coupling device according to claim 7, wherein at least one of the coaxial gradient lenses is a conical gradient lens.

9. A coupling device according to claim 7, wherein one of the two optical waveguides is integrally formed with a small end of the tapering waveguide.

10. A coupling device according to claim 1, wherein the tapering waveguide and one of the two optical waveguides are integral with the side edge of the waveguide being smooth curves at the point of transition therebetween.

* * * * *